United States Patent [19]

Hanchett

[11] 3,890,597

[45] June 17, 1975

[54] BAR GEOMETRY VERIFICATION SYSTEM FOR BAR-CODED CHARACTERS

[75] Inventor: Leland J. Hanchett, Winchester, Mass.

[73] Assignee: Taplin Business Machines Incorporated, Burlington, Mass.

[22] Filed: Sept. 17, 1973

[21] Appl. No.: 398,135

[52] U.S. Cl. .................... 340/146.3 Z; 235/61.11 E

[51] Int. Cl. .............................................. G06k 9/18

[58] Field of Search .............. 340/146.3 Z, 146.3 C, 340/146.3 K, 146.3 AG; 235/61.11 E

[56] References Cited

UNITED STATES PATENTS

| | | | |
|---|---|---|---|
| 3,309,667 | 3/1967 | Feissel et al. | 340/146.3 Z |
| 3,539,989 | 11/1970 | Hanchett, Jr. et al. | 340/146.3 Z |
| 3,617,704 | 11/1971 | Kapsambelis et al. | 340/146.3 Z |
| 3,676,645 | 7/1972 | Fickenscher et al. | 340/146.3 Z |

*Primary Examiner*—Gareth D. Shaw
*Assistant Examiner*—Leo H. Boudreau
*Attorney, Agent, or Firm*—Erwin Salzer

[57] ABSTRACT

Logic circuitry for generating a signal when bar-coded information includes noise signals. The logic circuitry detects instances in which the width of a bar is too narrow, or too wide, or the height of a bar too small, and generates an error signal when any such condition occurs. An error signal is also generated if the width of a bar is incorrect and not determinable.

3 Claims, 7 Drawing Figures

BAR GEOMETRY VERIFICATION SYSTEM FOR BAR-CODED CHARACTERS

BACKGROUND OF THE INVENTION

An electric signal resulting from scanning bar-coded information may be contaminated in either of two ways: A bar forming a constituent element of a bar-coded character may have a void in the black image thereof. As an alternative black or dark spots, respectively, may occur in the white background on which the code bars ar printed. It is, therefore, desired to achieve a significant signal enhancement by excluding noise signals resulting from the above referred-to printing defects or, in other words, excluding signals which do not fall within the specified range of correct bar dimensions. The problem of achieving such signal enhancement is of particular importance where the bar code includes bars which have different widths, e.g. narrow bars and wide bars.

The principal object of the present invention is to provide an error detection system which detects errors of the aforementioned kind and generates an error signal when such errors occur.

SUMMARY OF THE INVENTION

A system embodying this invention includes a clocked bar interval counter and a bar edge signal carrying line connected to said counter to restart the bar interval count of said counter at each bar edge signal carried by said line. The system further includes a too narrow flip-flop and a too wide flip-flop. Both said flip-flops are set by each edge signal carried by said line and reset by a count of said counter. The two narrow flip-flop is reset by a relatively low count of said counter, and the too wide flip-flop is reset by a relatively high count of said counter. The system further includes an OR-gate combining the output of said too narrow flip-flop and of said too wide flip-flop and a third or error flip-flop set by a character presence signal and reset by the output of said OR-gate. A system embodying this invention further includes a clocked first logic circuitry for generating a signal when a bar edge signal occurs during a period of time from a time when the count of said counter equals a first number exceeding said relatively low count to a time when the count of said counter equals a second number smaller than said relatively high count. Said first logic circuitry is connected to said error flip-flop to clear said error flip-flop by the signals generated by said first logic circuitry. Systems embodying this invention further include a second logic circuitry for sensing voltage errors caused by insufficient bar height. Said second logic circuitry is connected to said error flip-flop to clear said error flip-flop in response to said voltage errors.

DESCRIPTION OF PREFERRED EMBODIMENT

Figure 1:
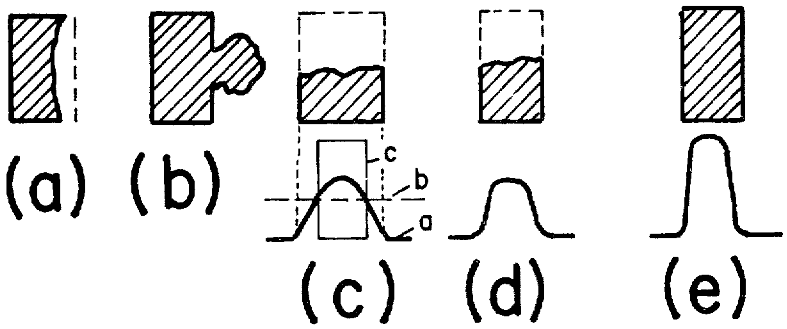
FIGS. 1(*a*) to 1(*e*) illustrate typical bar geometry errors.

FIG. 1(*a*) shows a narrow code bar which is not fully printed out or contains a void. When such a code bar is scanned by an optical scanning device and translated by an electro-optical transducer into an electric signal, the bar signal appears to be too narrow.

FIG. 1(*b*) shows a narrow bar with a protruberance, or smudge, to its right side. When this signal is scanned by an optical scanning device and translated by an electro-optical transducer into an electric signal, the bar signal appears to be too wide.

FIG. 1(*c*) shows a wide bar which has been printed out only in part, the lower part of the bar being printed out but the upper part of the bar being deleted. FIG. 1(*c*) further shows the analog signal which results when such a defective bar is translated by an electro-optical transducer into an electric signal, the threshold *b* applied in quantizing the analog signal *a*, and the erroneous or too narrow signal *c* resulting from quantizing the defective wide bar code.

It will be apparent from the above that the instances illustrated in FIG. 1(*a*) to FIG. 1(*c*) refer to errors in regard to the width of the particular bar under consideration, or to horizontal errors. FIG. 1(*d*) and FIG. 1(*e*) illustrate errors in regard to signal amplitude which may occur as a result of bar misprint. FIG. 1(*a*) shows a narrow bar whose height is less than the nominal height it should have, which nominal height is shown in FIG. 1(*e*). FIG. 1(*d*) shows also the electric analog resulting from reading of the bar which is too short and FIG. 1(*e*) shows also the electric analog signal which results from reading of a bar whose height is correct. Both signals differ in regard to their amplitude. In the first mentioned case the signal amplitude may, for instance, be 2 volt, and in the last mentioned case the signal amplitude may, for instance, be 4 volt.

Figures 2, 3:
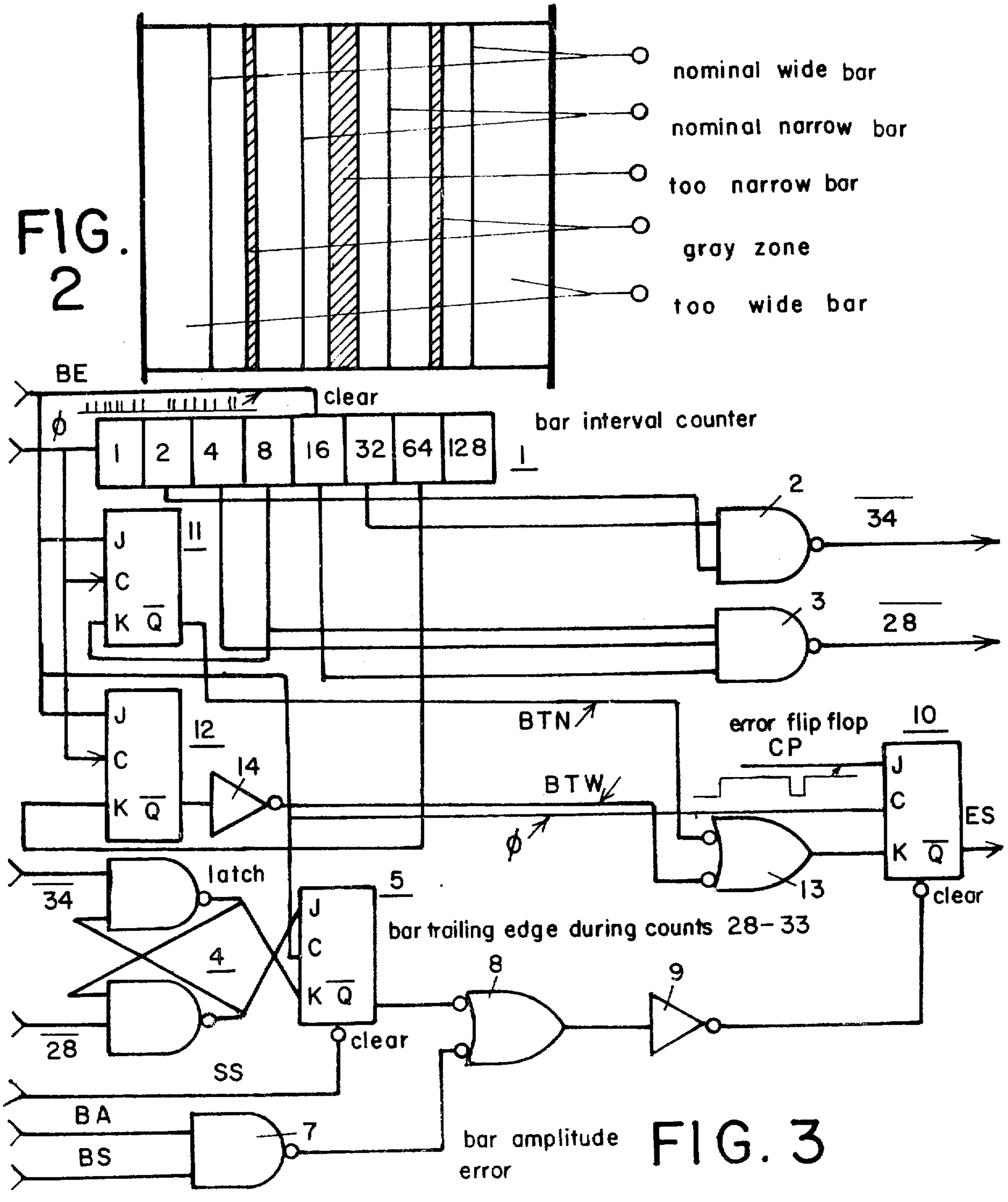
FIG. 2 is a diagram classifying possible errors in regard to bar widths.
FIG. 3 is a diagrammatic representation of an error signal generating system embodying the present invention.

Errors in regard to bar width may be classified as shown in FIG. 2. In that figure two lines indicate the normal width of a wide bar; two other lines indicate the normal width of a narrow bar; one line indicates a width of a bar which is too narrow, i.e. narrower than the width of a narrow bar; two lines indicate a gray zone, i.e. a zone which does not allow to determine whether the defective bar is a wide bar or a narrow bar, and two lines indicate the width of a bar that significantly exceeds the normal width of a wide bar.

The table below indicates Boolean definitions of the critical quantities which determine whether or not the geometry of a bar is correct. The clock count figures stated are appropriate for checking the specific code disclosed in the copending patent application of John F. Taplin, filed 6/23/72, Ser. No. 265,637 for PRINTING AND PROCESSING INFORMATION IN BINARY FORM. Each character set in this code includes four bars and three spaces, or inter-bar spaces. The bars may have either of two widths, i.e. they may either be narrow or wide or, in other words, the bar width is binary. The spaces, or inter-bar spaces, may have either of two widths, i.e. the space width is also binary.

| | | Possible Count |
|---|---|---|
| 1. | Smallest count of bar edge interval counter = a | >8 |
| 2. | $\bar{a}$ | <8 |
| 3. | Largest count of bar edge interval counter = b | <64 |
| 4. | $\bar{b}$ | >64 |
| 5. | Intermediate values of bar edge interval counter | |

-Continued

| | | Possible Count |
|---|---|---|
| | (gray zone) = c | >>28 |
| 6. | Bar signal = d | <<34 |
| 7. | Space signal = $\bar{d}$ | |
| 8. | Bar signal amplitude too small = e | <2v |
| 9. | Bar edge signal = f | |

The Boolean term for a geometry error condition is:

$$\bar{a} + f \cdot \bar{b} + f \cdot c \cdot \bar{d} + e$$

This term states that an error signal will be generated (1) if the bar width is too narrow; or (2) if the bar width is too wide; or (3) if the bar width is within the gray zone as defined by FIG. 2 and its context; or (4) if the voltage is too small as a result of the condition illustrated in FIG. 1(*d*). FIG. 3 is the preferred implementation of the above Boolean term.

Referring now to FIG. 3 showing a system embodying this invention, reference letters BE have been applied to indicate a line carrying bar edge signals. Bar edge signals are the first derivative of quantized bar signals and are, therefore, derived from bar signals by processing the same in a differentiating circuit. A preferred circuit for generating bar edge signals is disclosed in the copending patent application of Leland J. Hanchett, filed 9/17/73 Ser. No. 398,035 for BAR CODE PROCESSING AND DETECTING SYSTEM. Reference character $\phi$ has been applied to indicate a line carrying clock signal derived from a clock not shown in the drawing. Reference numeral 1 has been applied to generally indicate a bar interval counter which is caused to restart its count at each bar edge signal in line BE. Counter 1 controls two NAND-gates 2 and 3. The counter 1 is connected to NAND-gate 2 so that the latter senses the bar interval count 34 and the counter 1 is connected to NAND-gate 3 so that the latter senses the bar interval count 28. Reference numerals $\overline{\mathbf{34}}$ and $\overline{\mathbf{28}}$ have been applied to indicate the output lines of NAND-gates 2,3 which form the input lines for a latch to which reference character 4 has been applied to generally indicate the same. Latch 4 controls the J-K flip-flop which is clocked by line BE carrying bar edge signals. The output of flip-flop 5 is a criterion for the occurrence of a bar trailing edge during the counts 28 through 33. Flip-flop 5 is cleared by space signals carried by line SS. NAND-gate 7 has two inputs BA and BS. BA stands for bar amplitude and that signal occurs whenever the voltage resulting from the reading of a printed bar is too low, as explained in connection with FIG. 1(*d*). The output of NAND-gate 7 is, therefore, indicative of a bar amplitude error, BS standing for bar signal. The outputs of flip-flop 5 and of the NAND-gate 7 form the inputs of OR-gate 8 implemented by a NAND-gate connected to error flip-flop 10 by the intermediary of inverter 9. The line ES connected to the $\bar{Q}$ output terminal of flip-flop 10 carries error signals. Reference numerals 11 and 12 have been applied to generally indicate two J-K flip-flops. Both flip-flops are set by bar signals derived from line BE. Flip-flop 11 is reset by bar interval counter 1 when its count is 8, and flip-flop 12 is reset by bar interval counter 1 when its count is 64. The output of flip-flop 11 is indicative that the bar width is too narrow and, therefore, that flip-flop may be referred-to as too narrow flip-flop. The output of flip-flop 12 is indicative that the bar width is too wide and, therefore, that flip-flop may be referred-to as the too wide flip-flop. The $\bar{Q}$ output of too narrow flip-flop 11 forms one of the inputs of OR-gate 13 implemented by a NAND-gate, and the output of too wide flip-flop 12 is inverted by inverter 14 and forms the other input or OR-gate 13 whose output is connected to the K input of and resets error flip-flop 10. Reference character BTW has been applied to the line carrying the bar too wide signal, and reference character BTN has been applied to the line carrying the bar too narrow signal. The error flip-flop 10 is set by a character presence signal CP. Such a signal starts at the leftmost leading edge of any bar code set and terminates a fixed period of time after the trailing edge of the last bar of the character set. The character presence signal as defined above may be generated by means of character presence signal J-K flip-flop the circuitry of which is more fully disclosed in the copending patent application of Leland J. Hanchett, filed 10/15/73 Ser. No. 406,518 for ERROR AND SEQUENCE MAINTAINING SYSTEM FOR BAR CODE READERS, now abandoned.

Regarding the operation of the circuitry of FIG. 3, it will be apparent that a bar edge signal BE restarts the bar interval counter 1 and sets the too narrow flip-flop 11 and the too wide flip-flop 12. Should a bar edge signal occur before the too narrow flip-flop has been reset, an error condition will be reported by error flip-flop 10, i.e. line ES will carry an error signal. Should a bar code signal occur after the too wide flip-flop 12 has been reset, line ES will also carry an error signal. Furthermore, should a bar code signal occur during the bar interval counts 28–33, an error signal will be carried by line ES, in which case flip-flop 10 will be reset by the output of OR-gate 8 and inverter 9. Flip-flop 5 is responsive to the condition referred-to above and defined in FIG. 2 and its context as the gray zone. When a bar has a width which falls in the gray zone, no reliable judgement can be made as to the width of the bar, and thus an error must be forced by an asynchronous reset of flip-flop 10. Flip-flop 10 will be reset in the same fashion by the action of NAND-gate 7, or gate 8 and inverter 9 in case of a bar amplitude error, i.e. when the voltage resulting from reading of a code bar is less than a critical value.

I claim as my invention:

1. A system for the verification of the geometry of bar coded characters including a. a clocked bar interval counter;

b. a bar edge signal carrying line connected to said counter to restart the bar interval count of said counter at each bar edge signal carried by said line;

c. a clocked too narrow flip-flop set by each bar edge signal carried by said line and reset by a relatively low count of said counter;

d. a clocked too wide flip-flop set by each bar edge signal carried by said line and reset by a relatively high count of said counter;

e. an OR-gate combining the output of said too narrow flip-flop and said too wide flip-flop;

f. an error flip-flop set by a character presence signal and reset by the output of said OR-gate;

g. clocked first logic circuitry controlled by said counter for generating a signal when a bar edge signal occurs during a period from a time when the count of said counter equals a first number exceeding said relatively low count to a time when the count of said counter equals a second number smaller than said relatively high count, said first logic circuitry being connected to said error flip-flop to clear said error flip-flop by said signal;

h. a second logic circuitry for sensing voltage errors caused by insufficient bar height connected to said error flip-flop to clear said error flip-flop in response to said voltage errors;

i. a second OR-gate for combining the output of said first logic circuitry and the output of said second logic circuitry;

j. said OR-gate and said second OR-gate being implemented by a first and second NAND-gate; and k. an inverter interposed between said second NAND-gate and said error flip-flop.

2. A system for the verification of the geometry of bar coded characters including a. a clocked bar interval counter connected to a bar edge signal carrying line to restart said counter at each bar edge signal carried by said line;

b. a first clocked flip-flop set at each bar edge signal carried by said line and connected to said counter to produce too narrow signals if the count of said counter is less than a predetermined number;

c. a second clocked flip-flop set at each bar edge signal carried by said line and connected to said counter to produce a too wide signal if the count of said counter exceeds a predetermined number;

d. an OR-gate for combining said too narrow signal and said too wide signal;

e. a clocked error flip-flop having at least two inputs in addition to the clock input thereof, one of said additional inputs being supplied with a character presence signal and the other of said additional inputs being supplied with the output of said OR-gate;

f. both said first flip-flop and said second flip-flop being J-K flip-flops, the J-input of said first flip-flop and of said second flip-flop being bar edge signals;

g. said OR-gate being implemented by a NAND-gate;

h. the K-input of said first flip-flop being connected to said counter to receive a signal when a relatively small count of said counter occurs and the $\overline{Q}$ output of said first flip-flop being connected to one of the input terminals of said NAND-gate; and i. the K-input of said second flip-flop being connected to said counter to receive a signal when a relatively large count of said counter occurs, and the $\overline{Q}$ output of said second flip-flop being connected by the intermediary of an inverter to the other of the input terminals of said NAND-gate.

3. A system for the verification of the geometry of bar coded characters including a. a clocked bar interval counter connected to a bar edge signal carrying line to restart said counter at each bar edge signal carried by said line;

b. a first clocked flip-flop set at each bar edge signal carried by said line and connected to said counter to produce too narrow signals if the count of said counter is less than a predetermined number.

c. a second clocked flip-flop set at each bar edge signal carried by said line and connected to said counter to produce a too wide signal if the count of said counter exceeds a predetermined number;

d. an OR-gate for combining said too narrow signal and said too wide signal;

e. a clocked error flip-flop having at least two inputs in addition to the clock input thereof, one of said additional inputs being supplied with a character presence signal and the other of said additional inputs being supplied with the output of said OR-gate; and f. said error flip-flop being a J-K flip-flop having a clear input terminal, the J-input of said error flip-flop being supplied with a character presence signal, the K-input of said error flip-flop being supplied with the output of said OR-gate and said clear input terminal of said error flip-flop being supplied with a signal indicative of other error conditions than indicated by the output of said OR-gate.

* * * * *